United States Patent Office 3,577,230
Patented May 4, 1971

3,577,230
PROCESS OF APPLYING NOVEL ALGICIDES
Edward Helmut Sheers, Flushing, N.Y., assignor to
Arizona Chemical Company, New York, N.Y.
No Drawing. Filed Oct. 18, 1968, Ser. No. 768,919
Int. Cl. A01n 9/26
U.S. Cl. 71—67                                    3 Claims

ABSTRACT OF THE DISCLOSURE

A method for destroying or inhibiting microorganisms by contacting them with a trans-hydroxy-stilbene derivative, and a composition comprising said stilbene.

---

This invention relates to a process for controlling undesirable microorganisms in natural waters, swimming pools, ornamental water installations, industrial process waters, industrial and municipal effluents and the like. More particularly, it relates to processes for controlling the growth or eradicating algae and other microorganisms having a deleterious effect on industrial process water systems.

A principal object of this invention, therefore, is to provide a process for inhibiting or eradicating microbial growth, and particularly algal growth, by contacting such growth with stilbene derivatives. This and other objects of the invention will become more apparent as the description thereof proceeds.

In accordance with the present invention, it has now been found that waters normally subject to infestation with microorganisms, and particularly algae, may be rendered free of such infestation, or it may be effectively controlled within acceptable limits, by the addition of minor but effective amounts of a composition comprising a trans-stilbene of the formula:

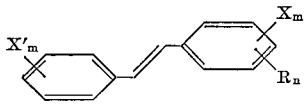

wherein R represents a hydroxy group, X and X' represent hydrogen, halogen, alkyl, alkoxy, aryl, aryloxy, carboxyl, nitro, sulfonic and other organic groups; $n$ is a number from 1 to 2; and $m$ is a number from 0 to 5.

Typical compounds are for example, trans-3,3-dihydroxystilbene, trans - 3,5 - dihydroxystilbene, trans-3-hydroxy-5-methoxystilbene, trans-3-methoxy-5-hydroxystilbene, trans-3-5-dihydroxy-3'-methoxystilbene, trans-3,4-dihydroxystilbene, trans-3-hydroxy-4-methoxystilbene, trans-3-methoxy-4-hydroxystilbene and alkylated, carboxylated, halogenated or other chemical modifications thereof. These agents may be employed singly, in admixtures of two or more, or in formulations where they are dissolved, emulsified, adsorbed on carriers, etc.; as well known in the art. They may be used either for the prevention of infestation with microorganisms, to inhibit the growth of such organisms, or for their partial or complete eradication.

Some of these aromatic stilbenes are found in nature, while others are products of chemical synthesis or chemical modifications of the naturally occurring compounds. Trans-3-5-dihydroxystilbene and its mono- and dimethyl ethers, for example, have been identified in extractives from the heartwood of the Pinus species. Numerous substituted stilbenes are shown in U.S. Pats Nos. 3,232,995; 2,878,291; and 2,914,570.

Contrary to the action of many other compounds which exhibit marked biocidal activity against a particular type of microorganism, the compounds of the present invention are remarkable for their broad spectrum of biocidal activity and show a high degree of toxicity against many distinctly different and unrelated microorganisms, including aglae, fungi, bacteria, and the like, such as for example, bacteria of the species Aerobacter, Bacillus, and Pseudomonas; fungi of the species Penicilium and Aerobacter; and algae of the species Ankistrodesmus, Anacystic, Gloeotrichia, Melosira, and Chlamydomonas. The compounds of this invention are effective at concentrations of one part per billion to about 200 parts per million.

The stilbenes of this invention may be, of course, either be applied alone or as active ingredients in suitable formulations. For example, when large surface areas of water are to be treated, it is preferred to apply a dilute solution in a suitable water-soluble solvent, such as methanol, ethanol, 2-propanol, and the like. Such a solution may be sprayed on the surface to be treated. Alternatively an aqueous emulsion may be used. The following examples are given to illustrate the invention and should not be considered limitative of the invention.

EXAMPLE I

Five unialgal cultures, freshly obtained from the Culture Collection of Algae, Indiana University, were used. These were Ankistrodesmus arcuatus, Chlamydomonas gigantea, Melosira varians, Anacystis aeruginosa, and Gloeotrichia echinulata. A control was used for each species. Growth of the algal species was studied at two dilutions, 1:1,000 and 1:1,000,000. Properly diluted trans-3,5-dihydroxy-stilbene was added to each flask containing 200 ml. of medium and a specific algal form. Bristol's medium was used for Ankistrodesmus arcuatus and Chlamydomonas gigantea; Kopp's medium was used for Melosira varians; ASM medium was used for the other species. The flasks were placed on a gyratory shaker and illuminated with Gro-Lux fluorescent tubes, alternating ten hours of light with fourteen hours of darkness. Turbidity measurements were made daily for a period of one week on samples taken from each flask. The results so obtained are shown in Table 1.

The control flask density for each culture on each day was assigned the value of 100%. Each of the three concentrations was reported as percent value of the control.

Table 1 lists the daily change in the color of each of the cultures.

At a dilution of $10^3$, trans-3,5-dihydroxy-stilbene kills Ankistrodesmus completely in three days. Gloeortrichia in four days, and Anacystis in three days. Melosira, at the end of one week, was reduced to 3 percent and Chlamydomonas to 20 percent of the control.

Trans-3,5-dihydroxystilbene at a dilution of $10^6$ gave greater than 50 percent reduction for each algal species except Gloeotrichia at the end of a seven day period.

This demonstrates the effectiveness of the compound against algal species which are difficult to control.

TABLE 1.—PERCENT OF CONTROL IN RELATION TO LIGHT TRANSMISSION

| Dilutions | Ankistrodesmus | | | Gloeotrichia | | | Anacystis | | | Chlamydomonas | | | Melosira | | |
|---|---|---|---|---|---|---|---|---|---|---|---|---|---|---|---|
| | $10^3$ | $10^6$ | $10^9$ | $10^3$ | $10^6$ | $10^9$ | $10^3$ | $10^6$ | $10^9$ | $10^3$ | $10^6$ | $10^9$ | $10^3$ | $10^6$ | $10^9$ |
| Days: | | | | | | | | | | | | | | | |
| 1 | 20 | 50 | 70 | 15 | 80 | 85 | 30 | 60 | 70 | 50 | 60 | 70 | 40 | 70 | 80 |
| 2 | 15 | 35 | 50 | 10 | 80 | 80 | 20 | 40 | 65 | 40 | 55 | 65 | 35 | 65 | 75 |
| 3 | 5 | 30 | 40 | 10 | 75 | 80 | 15 | 30 | 60 | 35 | 50 | 65 | 25 | 60 | 75 |
| 4 | 0 | 30 | 40 | 5 | 70 | 75 | 0 | 30 | 55 | 30 | 45 | 60 | 15 | 60 | 70 |
| 5 | 0 | 20 | 40 | 0 | 70 | 75 | 0 | 25 | 50 | 25 | 45 | 55 | 10 | 55 | 70 |
| 6 | 0 | 20 | 35 | 0 | 70 | 75 | 0 | 20 | 40 | 25 | 40 | 55 | 10 | 50 | 65 |
| 7 | 0 | 20 | 35 | 0 | 70 | 75 | 0 | 20 | 35 | 20 | 40 | 50 | 3 | 50 | 60 |

EXAMPLE II

Utilizing essentially the same test procedures described in Example I, control of algal growth was obtained with the other compounds recited at substantially the same toxicant levels.

While certain specific examples and preferred embodiments of the invention have been recited, it will be understood that this is solely to illustrate the invention and that various changes and modifications may be made in the invention without departing from the spirit of the disclosure and the scope of the appended claims.

I claim:
1. A method for destroying and inhibiting the growth of algae which comprises applying thereto an effective amount of a compound of the formula

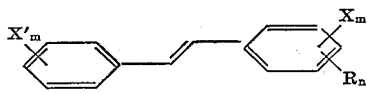

wherein R represents a hydroxy group; X and X' represent a member selected from the group consisting of hydrogen and lower alkoxy; $n$ is a number from 1 to 2, provided that the sum of the $n$ numbers does not exceed 2; and $m$ is a number from 0 to 5.

2. The method of claim 1 wherein said compound is applied in an amount of from about 1 to 200 parts per million in an inert diluent.

3. The method of claim 1 wherein said compound is trans-3,5-dihydroxystilbene.

References Cited

UNITED STATES PATENTS

| | | | |
|---|---|---|---|
| 2,776,986 | 1/1957 | Sanderson | 260—619 |
| 2,914,570 | 11/1959 | Robertson | 260—619 |
| 2,922,736 | 1/1960 | Spalding | 71—67 |
| 2,969,378 | 1/1961 | Gleim et al. | 71—67 |
| 2,990,420 | 6/1961 | Gleim et al. | 71—67 |
| 3,232,995 | 2/1966 | Solodar | 260—479 |

OTHER REFERENCES

Johnson et al.: "Role of Pinosylvines Etc." (1965), CA 64, pp. 13323-24 (1966).

Ascorbe: "The Inhibitory Action of Orangic Etc." (1953), CA 48, p. 12225 (1954).

LEWIS GOTTS, Primary Examiner

G. HOLLRAH, Assistant Examiner

U.S. Cl. X.R.

71—103, 115, 122; 210—62, 64; 424—317, 337, 341, 346, 347, 348